US 6,584,994 B2

(12) United States Patent
Knowles et al.

(10) Patent No.: US 6,584,994 B2
(45) Date of Patent: Jul. 1, 2003

(54) SERVICE SYSTEM AND METHOD

(75) Inventors: Steven M. Knowles, Silver Lake, IN (US); John R. Burke, New Baltimore, MI (US)

(73) Assignee: Prime Solutions LLC, Troy, MI (US)

( * ) Notice: Subject to any disclaimer, the term of this patent is extended or adjusted under 35 U.S.C. 154(b) by 0 days.

(21) Appl. No.: 09/817,139

(22) Filed: Mar. 27, 2001

(65) Prior Publication Data

US 2002/0100502 A1 Aug. 1, 2002

Related U.S. Application Data

(63) Continuation-in-part of application No. 09/735,609, filed on Dec. 14, 2000, which is a continuation-in-part of application No. 09/697,723, filed on Oct. 27, 2000.

(51) Int. Cl.$^7$ .................................................. F04F 3/00
(52) U.S. Cl. ........................ 137/14; 137/205; 141/42
(58) Field of Search ...................... 137/14, 205; 141/42

(56) References Cited

U.S. PATENT DOCUMENTS

| | | | |
|---|---|---|---|
| 2,227,611 A | * | 1/1941 | Walleser ...................... 141/42 |
| 2,317,589 A | * | 4/1943 | Collinson .................... 137/205 |
| 2,495,905 A | * | 1/1950 | Pogue ......................... 137/205 |
| 2,527,849 A | * | 10/1950 | Ranney ....................... 137/205 |
| 2,604,225 A | | 7/1952 | Armstrong et al. |
| 2,623,513 A | * | 12/1952 | Robertson ................... 137/205 |
| 2,708,588 A | | 5/1955 | Prah |
| 3,054,427 A | | 9/1962 | Bonnette et al. |
| 3,280,858 A | * | 10/1966 | Paulson ...................... 137/205 |
| 3,680,361 A | | 8/1972 | Taylor |
| 3,774,654 A | * | 11/1973 | Hjermstad ................... 141/42 |
| 4,235,100 A | | 11/1980 | Branchini |
| 4,782,689 A | | 11/1988 | DeRome |
| 4,888,980 A | | 12/1989 | DeRome |
| 4,996,874 A | | 3/1991 | Colomer et al. |
| 5,069,062 A | | 12/1991 | Malecek et al. |
| 5,368,753 A | | 11/1994 | Gardenier, Jr. |
| 5,390,636 A | | 2/1995 | Baylor et al. |
| 5,427,505 A | * | 6/1995 | Payne ......................... 137/205 |
| 5,560,407 A | | 10/1996 | Swinford |
| 5,613,549 A | | 3/1997 | Dolwani |
| 5,853,068 A | | 12/1998 | Dixon et al. |
| 6,029,720 A | | 2/2000 | Swinford |
| D431,007 S | | 9/2000 | Trigiani et al. |
| 6,112,759 A | * | 9/2000 | Hsu ........................... 137/148 |
| 6,135,067 A | | 10/2000 | Klamm et al. |
| 6,135,136 A | | 10/2000 | Klamm |
| 6,152,193 A | | 11/2000 | Klamm |
| 6,161,566 A | | 12/2000 | Klamm |
| D441,675 S | | 5/2001 | Trigiani et al. |
| 6,234,215 B1 | | 5/2001 | Klamm |
| 2001/0010237 A1 | | 8/2001 | Klamm et al. |

OTHER PUBLICATIONS

Coolant Tools; http://www.uview.com/Products/Coolant_Tools/body_coolant_tools.html; Oct. 20, 2000.

Mityvac Catalogue page: Mityvac® Specialty Tools, Item #04505 (Universal Radiator Adapter)—date unknown.

* cited by examiner

*Primary Examiner*—Gerald A. Michalsky
(74) *Attorney, Agent, or Firm*—Fish & Richardson P.C.

(57) ABSTRACT

A system for servicing a fluid system can employ a pressure-reducing source to perform the desired service. The fluid system can be an engine cooling system or other fluid system.

19 Claims, 8 Drawing Sheets

SERVICE SYSTEM AND METHOD

CLAIM OF PRIORITY

This application is a continuation-in-part of U.S. patent application Ser. No. 09/735,609, filed on Dec. 14, 2000, which is a continuation-in-part of U.S. patent application Ser. No. 09/697,723, filed on Oct. 27, 2000, the entire contents of which are hereby incorporated by reference.

TECHNICAL FIELD

This invention relates to a system and method of servicing a fluid system.

BACKGROUND

Leak testing of fluid systems, such as closed fluid systems, can be performed periodically. Fluid systems can be subject to corrosion and can develop leaks. Leaks present in fluid systems can decrease the functioning efficiency of the system and can result in excessive fluid loss and, ultimately, system failure. Thus, a fluid system typically requires periodic maintenance.

For example, automotive internal combustion engines typically utilize a liquid cooling system containing coolant, which can include water and a coolant additive, to maintain an optimal operating temperature for the engine. If enough coolant is lost, the engine can overheat with resulting damage to the system and the engine. A cooling system can be drained of fluid, leak tested and filled with new coolant fluid periodically to maintain the system. An operator can perform a number of manual procedures to perform these services. For example, the operator can manually drain a radiator via a drain valve or by removing a radiator hose. With the coolant fluid removed, the operator can remove the radiator cap and attach a vacuum fitting to the radiator orifice to test for leaks. Finally, the operator can remove the vacuum fitting and manually pour coolant into the radiator while observing the coolant level until the radiator is filled.

SUMMARY

In general, the invention features an apparatus and method of servicing fluid systems. The fluid system can be a closed fluid system, such as, for example, an engine cooling system, engine oil system, hydraulic system or brake system. Servicing can include draining, filling or leak testing the fluid system. The apparatus can employ a pressure-reducing source to perform one or more of the desired services.

In one aspect, the invention features an apparatus for servicing a fluid system. The apparatus includes a body and a connector on the body for forming a seal with an orifice of the fluid system. The body includes a first lower port fluidly connected to a first upper port by a first channel and a second lower port fluidly connected to a second upper port by a second channel.

In another aspect, the invention features a system for servicing a fluid system. The system can include a service apparatus including a body and a connector on the body for forming a seal with an orifice of the fluid system. The body includes a first lower port fluidly connected to a first upper port by a first channel, and a second lower port fluidly connected to a second upper port by a second channel.

In another aspect, a system for servicing a fluid system includes a reservoir capable of containing a fluid and having a reservoir orifice, and a service apparatus. The service apparatus can include a body and a sealing member on the body configured to form a seal with the reservoir orifice. The body includes a first lower port fluidly connected to a first upper port by a first channel. The system can include a pressure-reducing source fluidly connectable to the second upper port. The pressure-reducing source can be a venturi. In other embodiments, the system can include a drainage wand having a sufficient diameter and length to enter the service port.

The service apparatus can include a second lower port fluidly connected to a second upper port by a second channel and a valve proximate to the second channel that can stop fluid flow in the second channel when fluid enters the second lower port.

The reservoir can be a container having an internal volume and a pressure regulator. The pressure regulator can be a pressure relief valve operable to vent the internal volume when a pressure in the internal volume decreases below a threshold value. In certain embodiments, the pressure relief valve includes a cylindrical body, a poppet within the body, and a vent control knob. The cylindrical body can have an outer wall, an inner wall, and a channel fluidly connecting a first port and a second port. The poppet can be within the body and can be biased to close the channel, the poppet opening the channel when the pressure in the internal volume decreases below the threshold value. The vent control knob can be threadably attached to the first port, and can be capable of engaging and opening the poppet.

In another aspect, the invention features a method for servicing the fluid system. The method includes draining a fluid from the fluid system, connecting the service apparatus onto an orifice of the fluid system, changing the pressure of the fluid system through the second upper port, monitoring the pressure within the fluid system for a predetermined amount of time to detect a leak in the system and applying a reduced pressure to the second upper port to withdraw fluid from a fluid source fluidly connected to the first upper port, through the first channel and into the fluid system.

The apparatus can include a valve proximate to the second channel that stops fluid flow in the second channel when a fluid enters the second lower port. The valve can be a fluid-detecting valve and can include a float ball. The first upper port can include a valve.

The connector can include a sleeve made of resilient material surrounding the body. The sleeve can form a seal between the apparatus and the service port. The apparatus can include a sleeve compressor external to the body and in contact with the sleeve.

The fluid system can be a cooling system, such as an engine cooling system. The orifice can be a radiator orifice, such as a radiator fill port.

The system for servicing a fluid system can include a pressure gauge connectable to the second upper port. The system for servicing a fluid system can also include a pressure reducing source fluidly connectable to the second upper port. The pressure-reducing source can be a venturi. In certain embodiments, the system for servicing a fluid system can include a hose connectable to the first upper port or the second upper port of the apparatus or a drainage wand having a sufficient diameter and length to enter the orifice and enter the fluid system.

In another aspect, the invention features a method for draining a fluid system. The method includes fluidly connecting a drainage wand to a first upper port of a service apparatus, the apparatus being sealably connected with a reservoir and the drainage wand being inserted in an orifice of the fluid system, and applying a reduced pressure to a second upper port of the service apparatus to withdraw fluid from the fluid system into the reservoir.

In another aspect, a method of draining a fluid system includes fluidly connecting a drainage wand to a first upper port of a service apparatus, sealably connecting the service apparatus with a reservoir, inserting the drainage wand into a service port of a fluid system, and applying a reduced pressure to a second upper port of the service apparatus to withdraw fluid from the fluid system into the reservoir.

In another aspect, the invention features a method for filling a fluid system. The method includes applying a reduced pressure to a service apparatus to withdraw fluid from a fluid source fluidly connected to the service apparatus, through the apparatus, and into the fluid system. The service apparatus can include a valve proximate to a channel that stops fluid flow in the channel when the fluid enters the channel. The reduced pressure can be applied continuously to the service apparatus.

In another aspect, an apparatus for servicing a fluid system includes a body including a first lower port fluidly connected to a first upper port by a first channel, and a sealing member on the body configured to form a seal with an orifice of the fluid system when placed on the orifice. The seal with the orifice can increase when a reduced pressure is applied to the first upper port.

The body can include a second lower port fluidly connected to a second upper port by a second channel and a valve proximate to the second channel that stops fluid flow in the second channel when a fluid enters the second lower port. The valve can be a float valve. The float valve can include a float ball, a tapered plug, a pointed rod, a flapper valve, a poppet, or a hollow float. The first upper port can include a valve.

The sealing member can include a resilient material. The sealing member can form a sealing surface perpendicular to the first channel. The sealing member can include a flat rubber disk, a sizing ring and an o-ring, a bladder, a tapered member, or a resilient ring with a sealing lip, the lip contacting an inner surface of the orifice to form the seal.

The sealing member can include a sleeve. The apparatus can include a sleeve compressor, which can be threaded, external to the body and in contact with the sleeve. A threaded bolt can extend into the body and can be arranged to move the sleeve compressor thereby compressing the sleeve. In certain embodiments, the apparatus can include a cam external to the body arranged to move the sleeve compressor thereby compressing the sleeve.

In another aspect, a method for servicing a fluid system includes draining a fluid from the fluid system, sealing a service apparatus onto an orifice of the fluid system by reducing pressure in the system, and filling the system with a fluid source fluidly connected to the first upper port.

In another aspect, a method for filling a fluid system includes applying a reduced pressure to a service apparatus to withdraw fluid from a fluid source fluidly connected to a service apparatus, through the apparatus, and into the fluid system, the service apparatus forming a seal with the fluid system when the reduced pressure is applied.

The service apparatus can serve as a single tool for multi-function servicing of fluid systems. For example, the apparatus facilitates draining, leak testing, and filling of any contained fluid system, such as an internal combustion engine cooling system. The apparatus can also include a simple, automatic valve that allows the operator to avoid overfilling the fluid system, such as a radiator, or a drainage receptacle. Thus, an operator can use the apparatus without constantly monitoring its operation. In addition, by continuously applying a reduced pressure during filling, the occurrence of pockets of air, sometimes known as air locks, in the system can be reduced. Continuous application of reduced pressure combined with the automatic valve can allow systems of various sizes to be filled completely and rapidly. The apparatus also allows a fluid system to be completely filled without exchanging hoses or other attachments during the process. The containment of various features in the apparatus can provide cost advantages over other devices used for similar purposes such as automated service devices. The apparatus including the sealing member can form a seal with the orifice of the fluid system when the apparatus is placed on the orifice. The apparatus has a mass sufficient to apply pressure to the sealing member for the seal. When reduced pressure is applied to the apparatus, the seal is improved, simplifying the use of the apparatus to service a fluid system. The self-sealing apparatus can have a lower vertical profile than an adjustable apparatus, and can have no moving parts other than valves.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
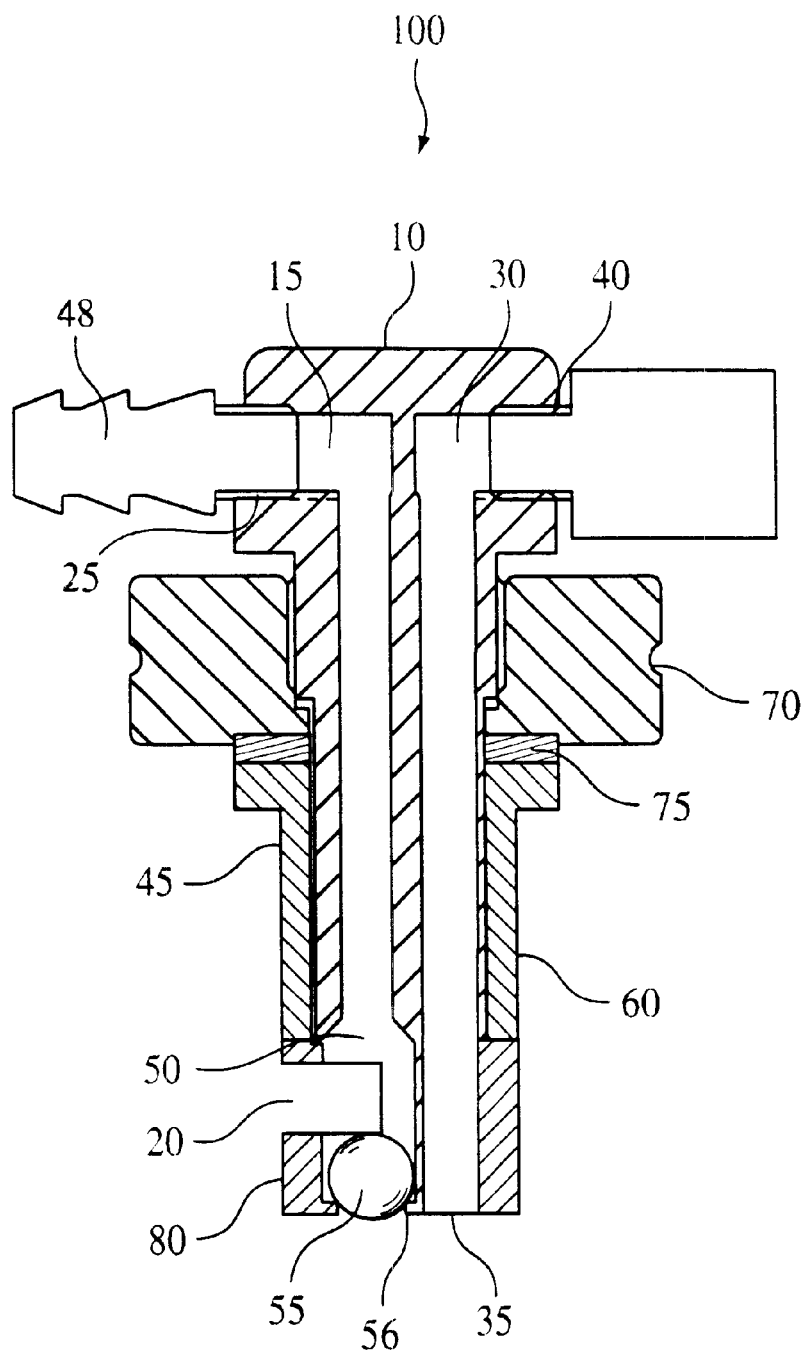
FIG. 1 is a schematic drawing depicting a section view of a service apparatus.

Referring to FIG. 1, service apparatus 100 includes body 10 with reduced pressure channel 15 having lower reduced pressure port 20 and upper reduced pressure port 25, fluid channel 30 having lower fluid port 35 and upper fluid port 40 and connector 45 on body 10. Upper reduced pressure port 25 may have a hose fitting 48 that is sufficiently sized to accept a section of flexible hose (not shown). Reduced pressure channel 15 can contain valve 50 that closes channel 15 when fluid enters lower reduced pressure port 20. Valve 50 can include float ball 55 proximate to lower reduced pressure port 20 that is buoyant in the fluid of the fluid system. Float ball 55 sits in recess 56 such that reduced pressure channel 15 passes substantially over ball 55. Fluid can enter lower reduced pressure port 20 or recess 56 to cause ball 55 to rise and close channel 15. Lower reduced pressure port 20 can be on a side of the apparatus. In other embodiments, lower reduced pressure port 20 can be at the end of the apparatus.

Connector 45 is sized to fit snugly into a fluid system orifice (not shown). Sleeve 60, which is composed of resilient material, can be fitted around the connector and held in place at the lower end of the body by retainer 80. Sleeve compressor 70 can be movably attached by threads to the outside of body 10 and positioned above bearing 75 that contacts sleeve 60. Sleeve compressor 70 can be a knob that is rotated, forcing the knob toward sleeve 60, thereby compressing the sleeve and expanding it outwardly to seal with the orifice. In other embodiments, the sleeve compressor can be movable by a threaded bolt extending into the body (not shown) that can be tightened to compress and thereby expand the sleeve. In another embodiment, the sleeve compressor can be moved by a cam (not shown) external to the body. The cam can be rotated, for example with a lever, forcing the sleeve compressor into the sleeve, thereby causing the sleeve to compress and expand. In order to accommodate different diameter fluid system orifices, sleeve 60 can be replaced with a sleeve having a smaller or larger diameter by removing retainer 80, slipping sleeve 60 off of body 10, and installing a new sleeve having a different diameter. Alternatively, a supplemental sleeve (not shown), which has an inner opening that corresponds to the outer diameter of sleeve 60, can be slipped over the outer surface of sleeve 60 to accommodate a larger diameter system orifice. In certain embodiments, a sealing member can form the seal with the fluid system orifice.

Figure 2A:
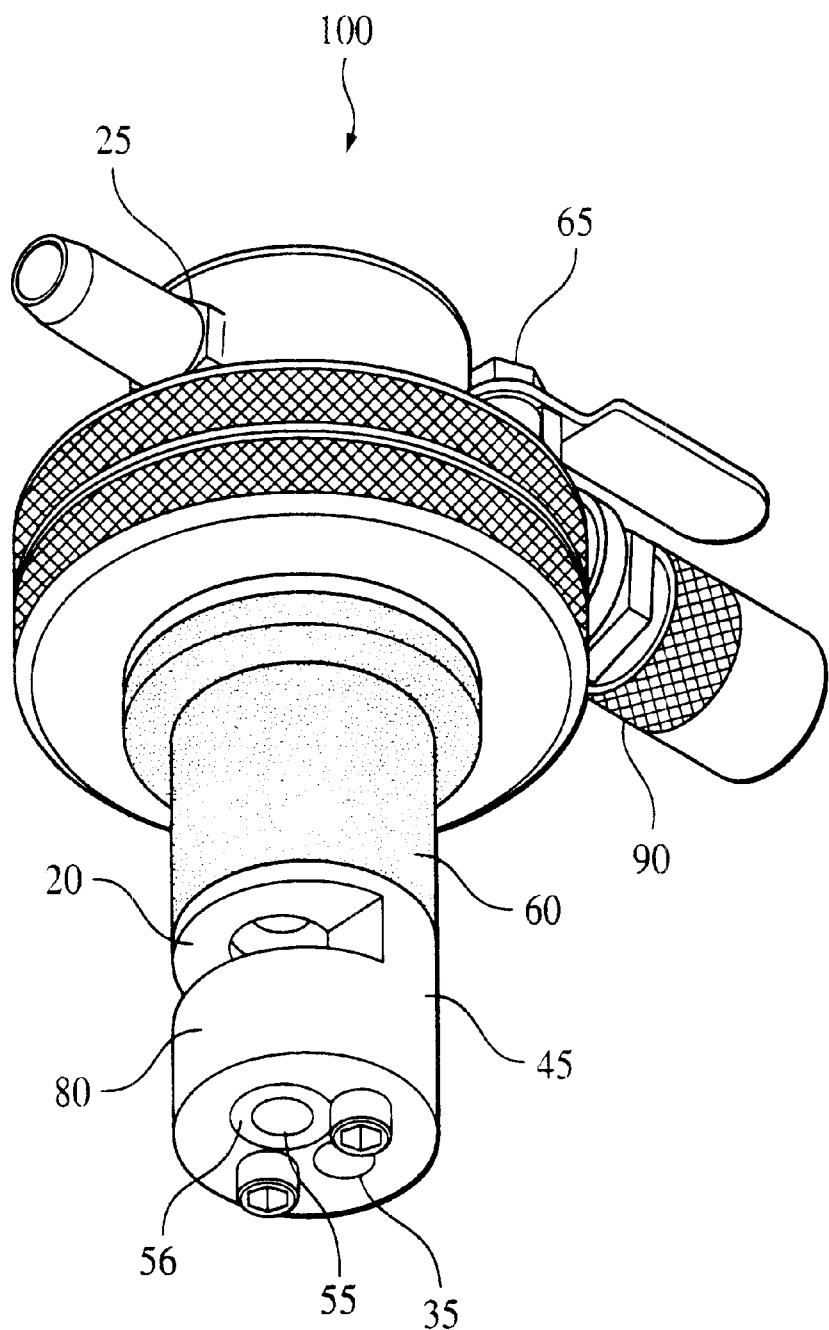
FIGS. 2A and 2B are perspective views of a service apparatus.
Figure 2B:
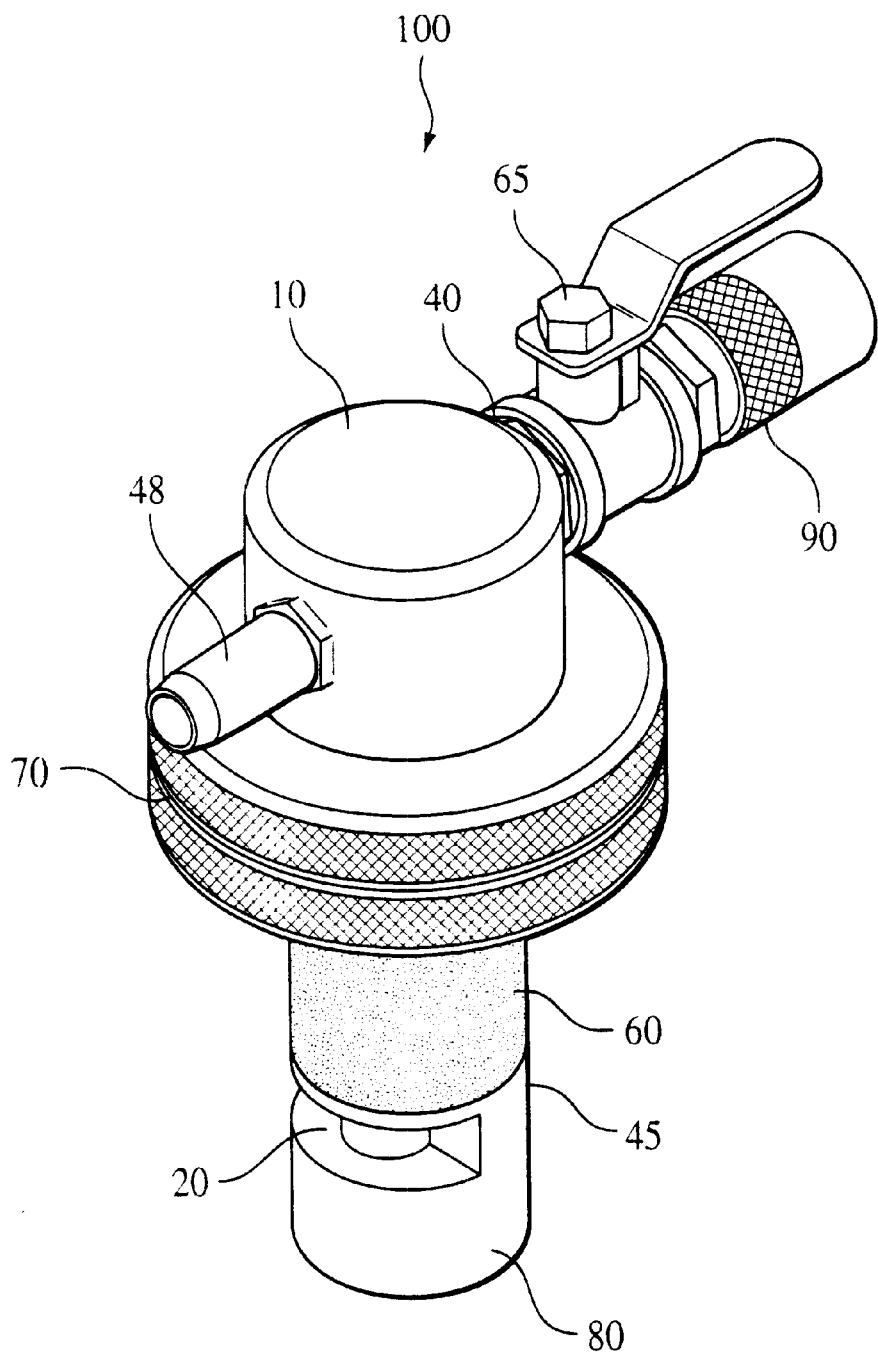

Referring to FIGS. 2A and 2B, service apparatus 100 includes body 10, connector 45, sleeve 60, lower reduced pressure port 20, upper reduced pressure port 25, lower fluid port 35 and upper fluid port 40. Upper fluid port 40 is connected to a valve 65 to control fluid flow or leak test the system. Valve 65 can be a ball valve, as shown. Valve 65 can connect to a fluid hose (not shown) via quick connect fitting 90. Upper reduced pressure port 25 may connect to hose fitting 48 that connects to a pressure-reducing source (not shown). Retainer 80 may be attached to the bottom of the body by screws.

Figure 3:
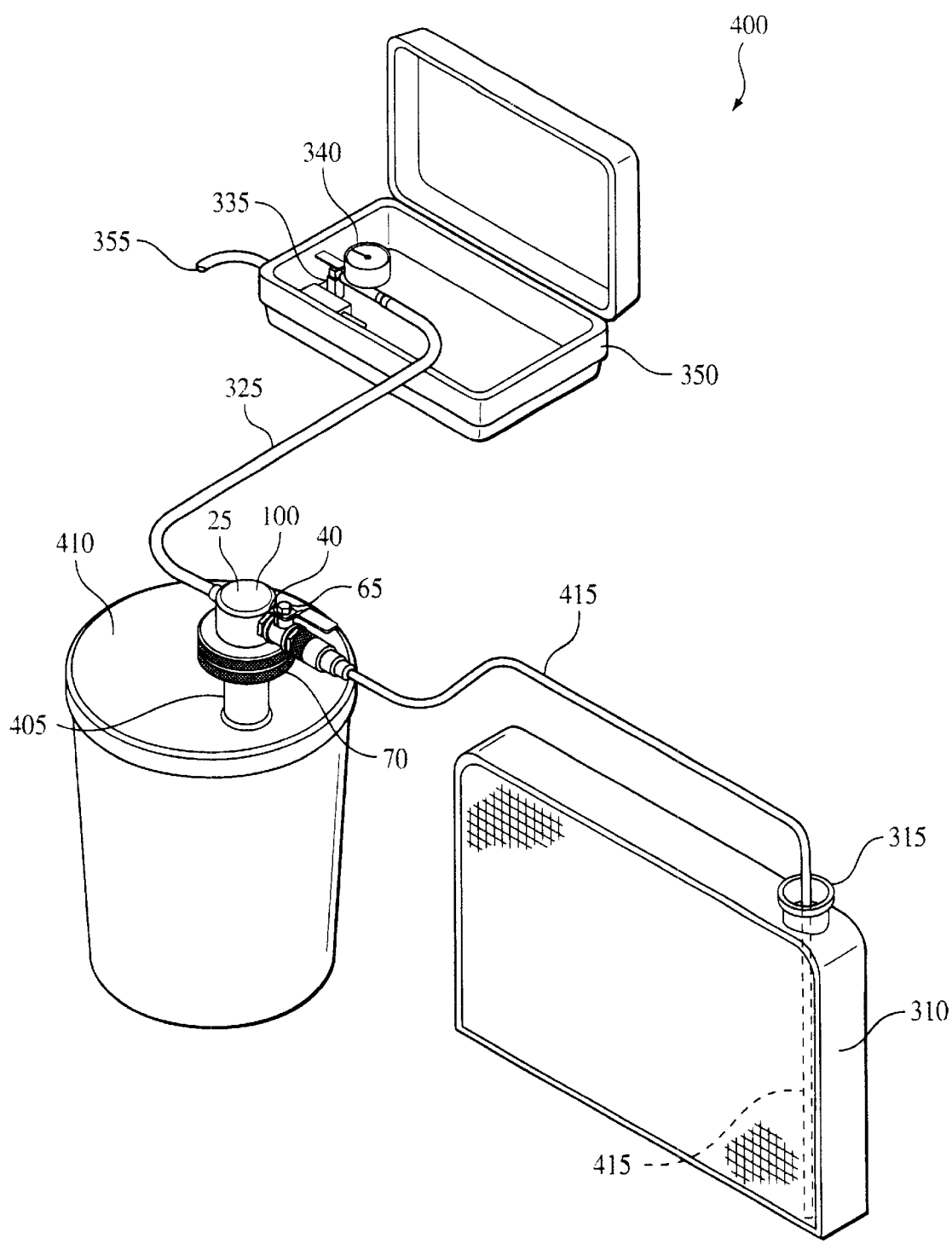
FIG. 3 is a perspective view of a service kit used in a drain mode.

As shown in FIG. 3, service apparatus 100 can be configured as a system 400 to drain fluid from fluid system 310. For example, as shown in FIG. 3, fluid system 310 can include a radiator of a cooling system of an internal combustion engine, in which case coolant is drained from the system. Service apparatus 100 is sealed to orifice 405 of reservoir 410. Sleeve compressor 70 is rotated to create an airtight seal between apparatus 100 and orifice 405. Valve 65 can be positioned to seal upper fluid port 40. Drainage wand 415 is connected to upper fluid port 40 and inserted in system 310. Drainage wand 415 can be a flexible hose or a plastic tube having a diameter sufficiently small to be inserted through orifice 315 of system 310. Alternatively, a first end of a hose is connected to upper fluid port 40 and the other end of the hose is connected to drainage wand 415. One end of hose 325 is connected to upper reduced pressure port 25. The other end of hose 325 is connected to a pressure-reducing source 335, such as a venturi, which can include a muffler to reduce noise or a section of hose extending from case 350. When pressure-reducing source 335 is a venturi, it is connected to air source 355 to generate a reduced pressure in reservoir 410. Reservoir 410 can be a container that withstands the reduced pressure applied to the system without collapsing or includes a pressure regulator or other release mechanism to avoid collapse. For example, the pressure regulator can be a pressure relief valve 700, as described below and shown in FIG. 7, which can prevent the pressure of the internal volume of the container from decreasing below a threshold reduction from ambient pressure that would otherwise cause the container to collapse.

In operation, the pressure can be reduced by, for example, 1–25 inches of mercury to drain the system. Valve 65 is opened, thereby applying the reduced pressure to system 310. The reduced pressure pulls fluid from system 310, through hose 320 and apparatus 100 and into reservoir 410. If the fluid has filled reservoir 410, the float ball rises in the fluid, thereby blocking the application of reduced pressure and stopping the flow of fluid. Reservoir 410 can be sealed and the used fluid can be disposed of or recycled.

When servicing fluid system 310, other draining methods may be employed. For example, a drain valve (not shown) in the system, for example, at the bottom of a radiator, can be opened to drain the system by gravity. In other cases, a system hose (not shown) may be removed to allow the fluid to drain from system 310.

Figure 4:
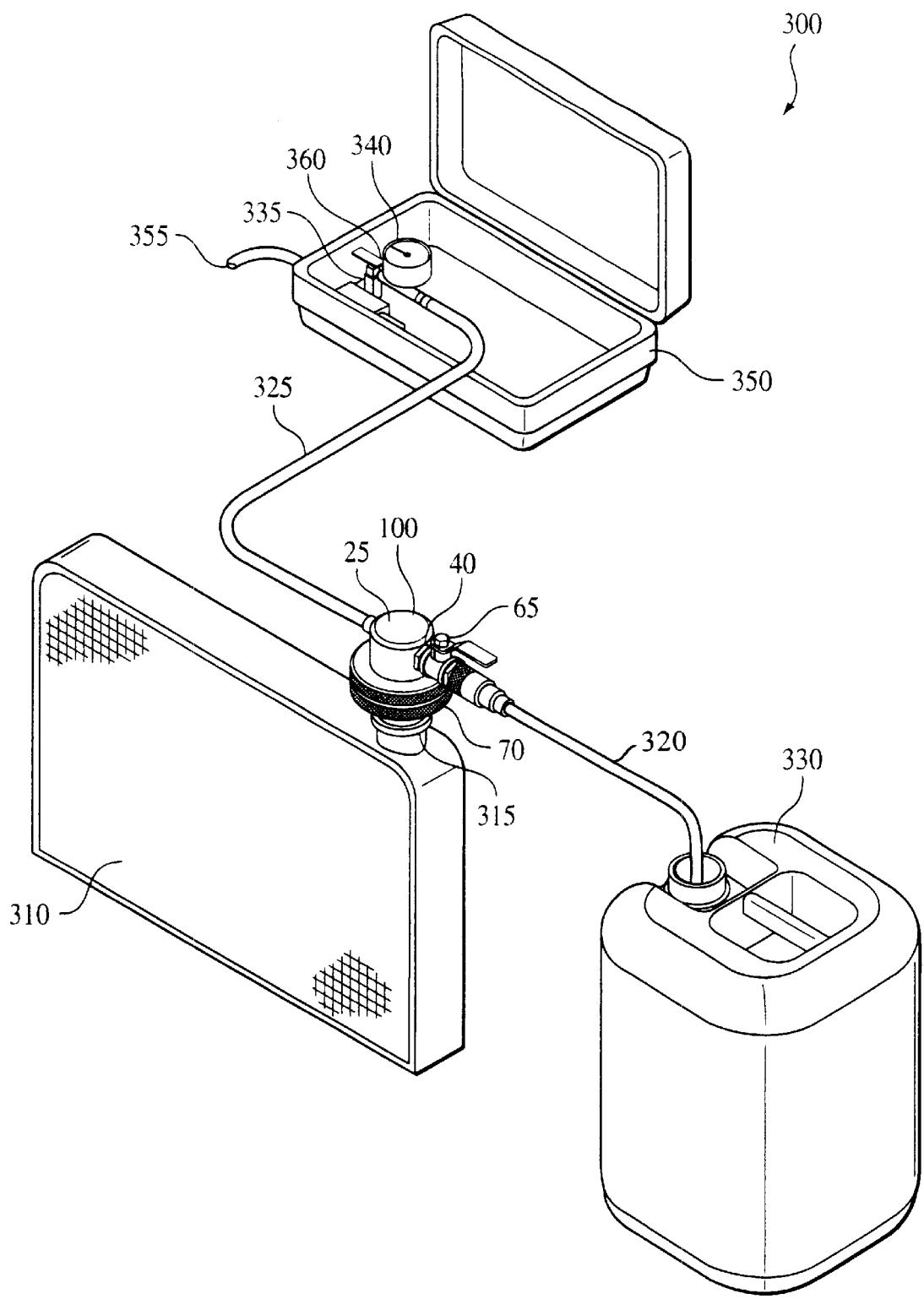
FIG. 4 is a perspective view of a service kit used in a test and fill mode.

Referring to FIG. 4, apparatus 100 can be used to test system 310 for leaks. With radiator 310 drained, or partially drained of fluid, service apparatus 100 can be sealed to orifice 315 of system 310. Reduced pressure is applied to system 310 with valve 65 in a closed position. The occurrence of air pockets can be reduced by reducing the pressure in the system as much as possible. The pressure can be reduced by, for example, 25 inches of mercury or more. Valve 360 is then closed to stop application of the reduced pressure to the system and seal the system for leak testing. For a predetermined period of time, such as 5–10 minutes, the pressure of the system can be monitored at gauge 340. A change of pressure indicates a leak in system 310. A leak in the system can be repaired before filling it with replacement fluid.

Referring to FIG. 4, system service apparatus 100 can be part of a system 300 to fill a fluid system with fluid. For example, as shown in FIG. 4, fluid system 310 can include a radiator of a cooling system of an internal combustion engine, in which case coolant is added to the system. The system can be empty, partially filled, or nearly filled when the apparatus is used to fill it. Service apparatus 100 is installed in orifice 315 of system 310. Sleeve compressor 70 is rotated to create an airtight seal between the apparatus 100 and orifice 315. One end of hose 320 is connected to upper fluid port 40. The other end of hose 320 is placed inside fluid source 330, which can be a container filled with a fluid. One end of a second hose 325 is connected to upper reduced pressure port 25. The other end of hose 325 is connected to pressure reducing source 335. As shown, service apparatus 100 may be packaged in a case 350 that houses pressure reducing source 335 and pressure gauge 340.

When pressure-reducing source 335 is a venturi, it is connected to air source 355 to generate a reduced pressure in system 310. The reduced pressure pulls fluid from reservoir 330 through hose 320 and apparatus 100, and into system 310. The reduced pressure can be applied continuously to the apparatus 100 during the filling process. As the fluid level in system 310 rises and reaches orifice 315, the fluid causes float ball 55 to rise and close the channel in the apparatus, stopping the reduced pressure applied to the system and, consequently, stopping the flow of fluid into system 310 through hose 320. The system can be run after the filling process has stopped, while the reduced pressure is being applied, to remove air that may continue to reside in the system. Alternatively, apparatus 100 can be removed from the system, the system can be run for, for example, 1–5 minutes, to move air pockets in the system, and apparatus 100 can be used to reduce pressure in the system and fill the system a second time. This process can be repeated to further reduce the amount of air in the system. After filling is complete, apparatus 100 can be removed from system 310.

The body 10, valve 65, valve 360, pressure reducing source 335, pressure gauge 340, reservoir 410, and receptacle 330 can be made from rigid materials such as machined, molded or cast metal or plastic. The sleeve 60 and hose 320, hose 325, and wand 415 can be made of resilient materials such as a rubber or plastic composition. The float ball 55 can be made of a material that has a specific gravity that is lighter than the system fluid, yet heavy enough to avoid blocking the reduced pressure channel 15 in the absence of the fluid. For example, the float ball can be made of polypropylene.

Figure 5:
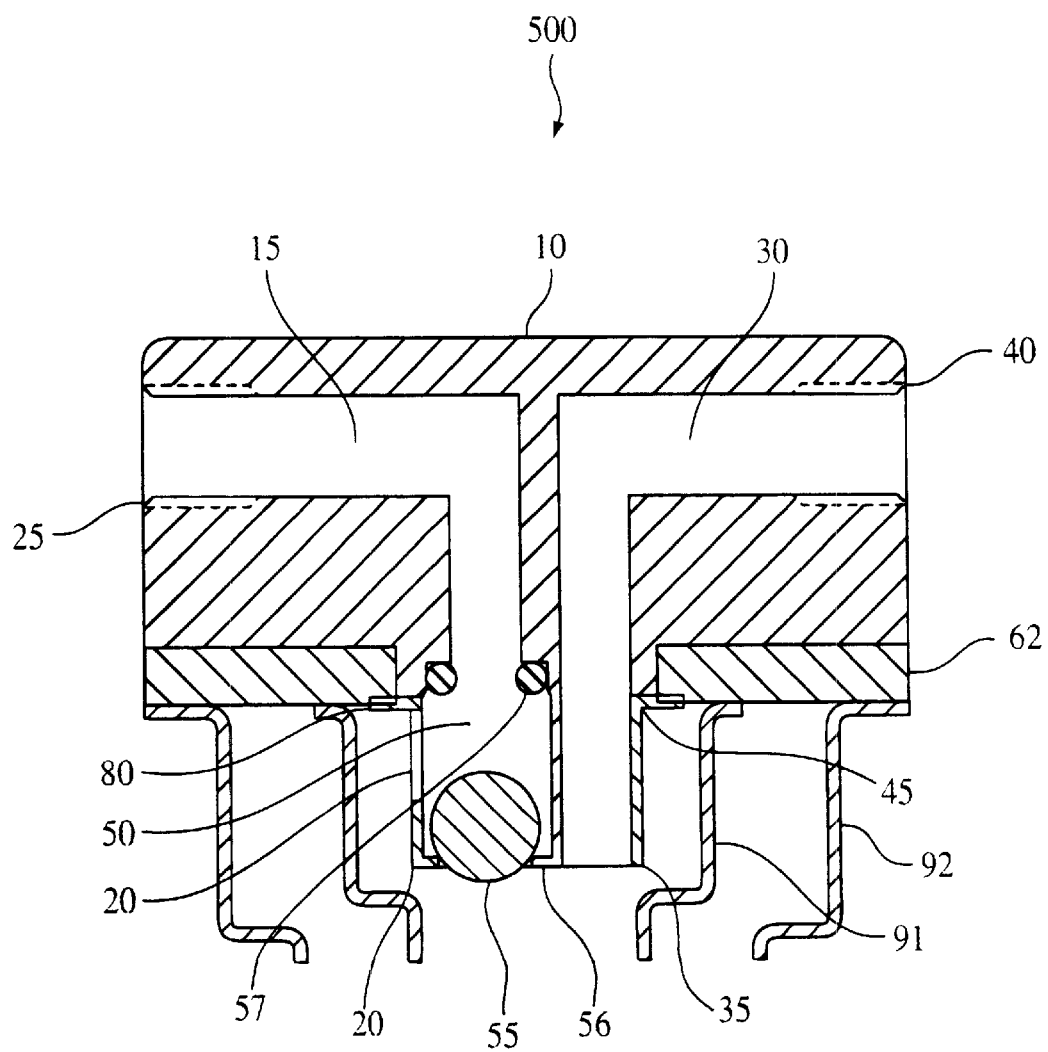
FIG. 5 is a schematic drawing depicting a section view of a service apparatus.

Referring to FIG. 5, service apparatus 500 includes body 10 with reduced pressure channel 15 having lower reduced pressure port 20 and upper reduced pressure port 25, fluid channel 30 having lower fluid port 35 and upper fluid port 40 and connector 45 on body 10. Reduced pressure channel 15 can contain valve 50 that closes channel 15 when fluid enters lower reduced pressure port 20. Valve 50 can include float ball 55 proximate to lower reduced pressure port 20 that is buoyant in the fluid of the fluid system. Float ball 55 sits in recess 56 such that reduced pressure channel 15 passes substantially over ball 55. Fluid can enter lower reduced pressure port 20 or recess 56 to cause float ball 55 to rise and close channel 15 when float ball contacts float ball seal 57. The connector 45 configured to form a seal with an orifice of the fluid system can include sealing member 62. Sealing member 62 on body 10 is configured to form a seal with the orifice when placed on the orifice (not shown). The sealing member can form the seal without mechanical adjustment of sealing member dimensions.

Sealing member 62 can be a ring of resilient material, for example, a continuous ring, which is fitted around the body 10. Sealing member 62 can be held in place at the lower end of the body 10 by retainer 80. The resilient material can include a rubber, such as butyl rubber or silicone rubber. The sealing member can have a hardness between Shore OO durometer of 20 and Shore A durometer of 80, or Shore A durometer of 20 to 60, such as a Shore A durometer of 40.

Sealing member 62 can seat onto a fluid system orifice or reservoir orifice to form a seal. The seal can be improved by applying reduced pressure to the upper reduced pressure port 25. When orifice is a radiator neck of a cooling system, the apparatus can form a seal with smallest orifice 91, typically having an inside diameter of 1.10 inches, and with largest orifice 92, typically having an inside diameter of 2.70 inches.

Sealing member 62 can have a flat surface or a square shape such as a gasket. The gasket can be sized to seal with orifices, such as radiator necks, ranging in inside diameter from 1 inch to 2.5 inches. In other embodiments, sealing member 62 can be tapered, such as a plug having a wide surface adjacent to the upper ports, which tapers to a narrow surface adjacent to the lower ports. The taper of the plug can allow the apparatus to seal with different sized fluid system orifices. In other embodiments, sealing member 62 can be a bladder having an annular or donut shape, which can be filled with a gel, such as, for example, a silicone, to give the sealing member a compliant texture that conforms to the shape of the orifice. The bladder can be sized to fit various diameter fluid system orifices. The bladder can be bonded to body 10 with an adhesive instead of using retainer 80 to affix the bladder to the body. Alternatively, the bladder can be bonded to a ring (not shown), which can attach to the body. In other embodiments, sealing member 62 can be an o-ring combined with a sizing ring that holds the o-ring in place. The o-ring and sizing ring can have a range of sizes to accommodate fluid system orifices of varying diameters. The sizing ring can fit between the o-ring and the body to seal with the fluid system orifice. In other embodiments, sealing member 62 can be an elongated plug having a lip, such as a wedge-shaped sealing lip, extending away from the plug that forms a seal with an inner surface of the orifice when inserted into the orifice. The sealing lip can be sized to accommodate a range of orifice inside diameters, for example, from 1.0 inch to 1.2 inches. The plug with sealing lip can have several different sizes to accommodate other orifice inside diameters, such as 1 inch, 1.5 inch, 1.75 inch and 2.0 inch orifices.

Figure 6A:
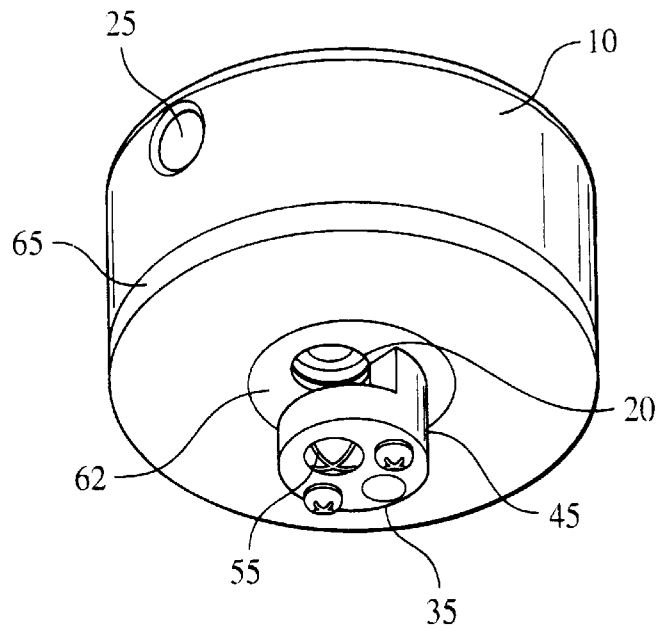
FIGS. 6A and 6B are perspective views of a service apparatus.
Figure 6B:
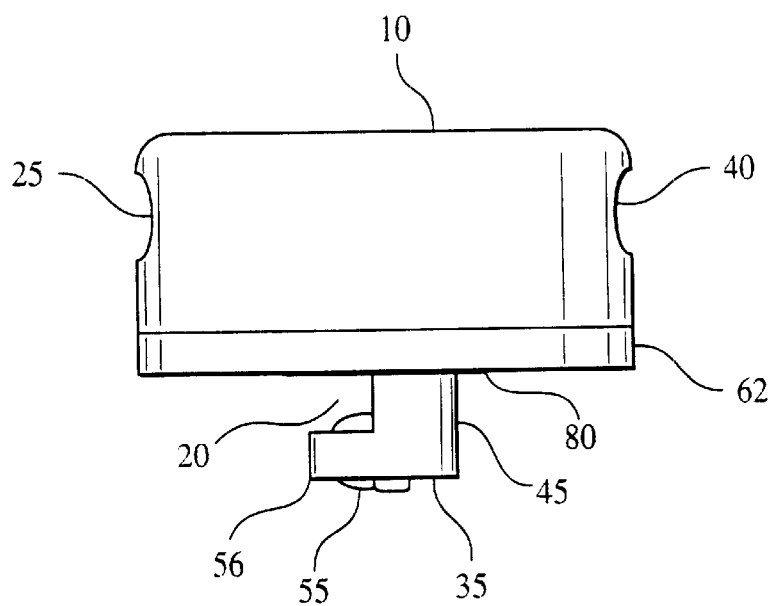

Referring generally to FIGS. 6A and 6B, two perspective views of the apparatus illustrated in FIG. 5 includes body 10, upper reduced pressure port 25, upper fluid port 40, connector 45, lower reduced pressure port 20 and lower fluid port 35. Connector 45 includes sealing member 62 and extends perpendicularly from the body to position the lower fluid ports down into the neck of a fluid system orifice. Sealing member 62 is fixed to the body 10 by retainer 80. Float ball 55 rests in recess 56 when no fluid is present.

Figure 7:
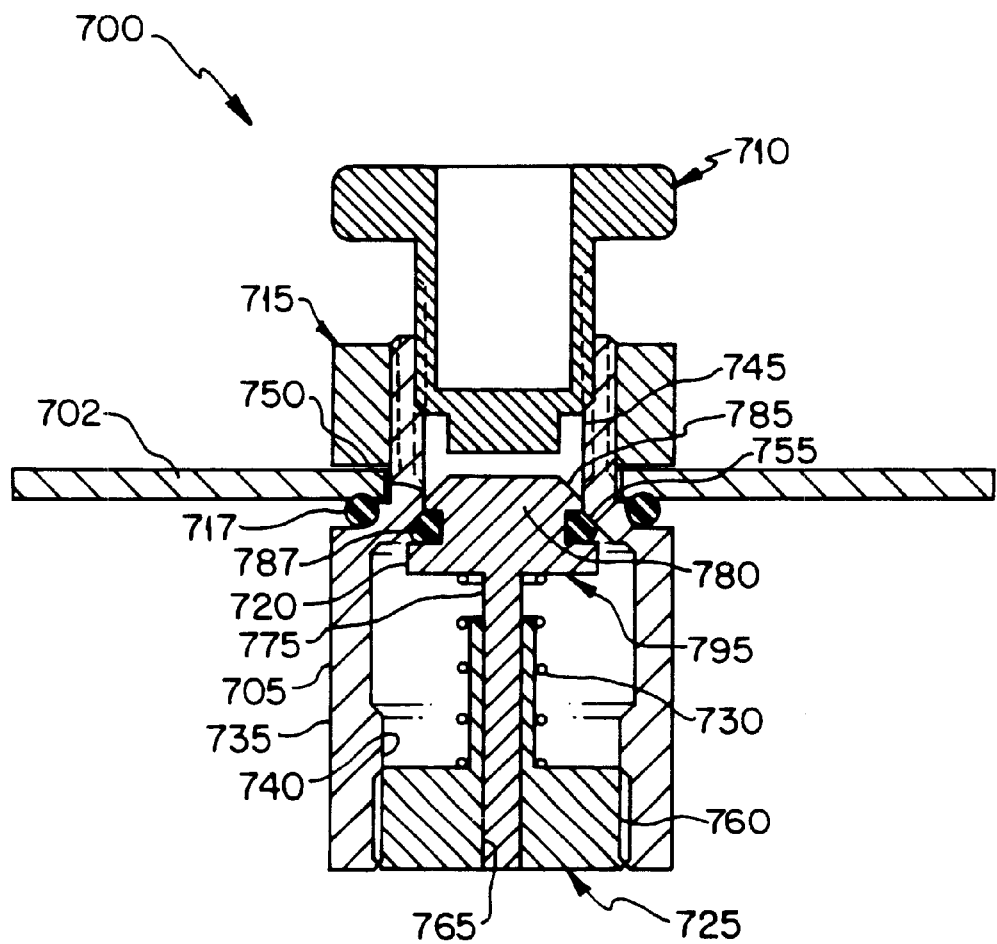
FIG. 7 is a schematic drawing depicting a pressure regulator.

Referring to FIG. 7, a pressure relief valve 700 penetrates wall 702 of the reservoir. Pressure relief valve 700 includes a cylindrical body 705, a vent control knob 710, a mounting nut 715, a sealing member 717, a poppet 720, a poppet holder 725, and a poppet spring 730. Vent control knob 710 is external to the reservoir and poppet 720 is internal to the reservoir. Mounting nut 715 presses wall 702 into sealing member 717 to seal the internal volume of the reservoir from the external atmosphere.

The body 705 includes an outer wall 735, an inner wall 740, a threaded vent port 745, neck 750, a sealing surface 755, and a threaded poppet port 760. The outer wall 735 of the neck 750 includes threads for attaching the mounting nut 715. The threaded vent port 745 threadably attaches the vent control knob 710 to the body 705. The threaded poppet port 760 threadably attaches the inner wall 740 to the poppet holder 725. The poppet holder 725 includes an elongated cylindrical aperture 765.

The poppet 720 has a shaft 775 that fits into the aperture 765. The poppet 770 also has a head 780 with a beveled edge 785 that retains a sealing ring 787 which contacts the sealing surface 755 of the body 705 when the valve is in a closed position. The poppet spring 730 upwardly biases the poppet 720 in the closed position, as shown.

The poppet 720 moves from the closed position to an open position when the pressure internal to the reservoir is reduced below a threshold level relative to pressure external to the reservoir. The threshold level for opening the poppet 720 is determined by the spring constant of the poppet spring 730. The spring 730 can be selected to open before the reduced pressure internal to the reservoir collapses the reservoir. For example, a threshold level of 7 to 9 inches of mercury can collapse a plastic container, a result that can be avoided with the pressure release valve.

Under circumstances where maintaining the pressure release valve in an open position is desired, such as when coolant is poured from the reservoir, the poppet 720 can be maintained in an open position by screwing the vent control knob 710 into body 705 to hold the poppet 720 in an open position.

A number of embodiments of the invention have been described. Nevertheless, it will be understood that various modifications may be made without departing from the spirit and scope of the invention. For example, the apparatus can be used to drain, leak test, and fill a variety of closed fluid-containing systems, such as engine cooling systems, engine oil systems, hydraulic systems or brake systems. Accordingly, other embodiments are within the scope of the following claims.

What is claimed is:

1. A method of draining a cooling system comprising:
   fluidly connecting a drainage wand to a first upper port of a service apparatus;
   sealably connecting the service apparatus with a reservoir;
   inserting the drainage wand into an orifice of a radiator; and
   applying a reduced pressure to a second upper port of the service apparatus to withdraw fluid from the cooling system into the reservoir.

2. The method of claim 1, wherein the reservoir includes a pressure regulator.

3. The method of claim 2, wherein the pressure regulator is a pressure relief valve a pressure relief valve operable to vent the internal volume when a pressure in the internal volume decreases below a threshold value.

4. A method of draining a fluid system comprising:
   sealably connecting a service apparatus with a reservoir, the reservoir being a container having an internal volume and a pressure regulator;
   inserting a drainage wand into a service port of a fluid system; and
   applying a reduced pressure to the service apparatus connected to a pressure reducing source to withdraw fluid from the fluid system into the reservoir, the drainage wand being fluidly connected to a first upper port of the service apparatus.

5. The method of claim 4, wherein the pressure regulator is a pressure relief valve operable to vent the internal volume when a pressure in the internal volume decreases below a threshold value.

6. The method of claim 5, wherein the pressure relief valve comprises:
   a cylindrical body having an outer wall, an inner wall, and a channel fluidly connecting a first relief port and a second relief port;
   a poppet within the body biased to close the channel, the poppet opening the channel when the pressure in the internal volume decreases below the threshold value; and
   a vent control knob threadably attached to the first relief port and capable of engaging and opening the poppet.

7. The method of claim 4, wherein the service port is an orifice of a radiator of a cooling system.

8. The method of claim 4, wherein the service apparatus comprises:
   a body including a first lower port fluidly connected to the first upper port by a first channel; and
   a sealing member on the body configured to sealably connect the service apparatus with the reservoir.

9. The method of claim 8, wherein the first upper port includes a valve.

10. The method of claim 8, wherein the service apparatus includes a second lower port fluidly connected to a second upper port by a second channel and a valve proximate to the second channel that stops fluid flow in the second channel when fluid enters the second lower port.

11. The method of claim 10, wherein the pressure-reducing source is fluidly connectable to the second upper port.

12. The method of claim 8, wherein the sealing member comprises a resilient material.

13. The method of claim 12, wherein the service apparatus further includes a sleeve compressor external to the body and in contact with the sleeve.

14. The method of claim 8, wherein the sealing member forms a sealing surface perpendicular to the first channel.

15. The method of claim 8, wherein the sealing member is a connector including a sleeve made of resilient material surrounding the body, the sleeve forming a seal between the service apparatus and the service port.

16. The method of claim 4, wherein reduced pressure is applied by the pressure-reducing source with a venturi.

17. The method of claim 4, wherein the drainage wand has a sufficient diameter and length to enter the service port and further comprising withdrawing the drainage wand from the service port after the fluid is withdrawn from the fluid system into the reservoir.

18. A method for draining a fluid system comprising:
   fluidly connecting a drainage wand to a first upper port of a service apparatus having a body and a sleeve made of resilient material, the sleeve being sealably connected to a reservoir; and
   the drainage wand being inserted in an orifice of the fluid system; and
   applying a reduced pressure to a second upper port of the service apparatus to withdraw fluid from the fluid system into the reservoir.

19. The method of claim 18, wherein the fluid system is a cooling system.

* * * * *